United States Patent
Gozukara et al.

(10) Patent No.: US 6,579,607 B1
(45) Date of Patent: Jun. 17, 2003

(54) PERMEABLE PACKAGING FILM

(75) Inventors: Yesim Gozukara, Clayton (AU); Gregor Bruce Yeo Christie, Hawthorn Victoria (AU)

(73) Assignee: Dow Global Technologies, Inc., Midland, MI (US)

(*) Notice: Subject to any disclaimer, the term of this patent is extended or adjusted under 35 U.S.C. 154(b) by 0 days.

(21) Appl. No.: 09/581,314

(22) PCT Filed: Dec. 23, 1998

(86) PCT No.: PCT/AU98/01074
§ 371 (c)(1),
(2), (4) Date: Jun. 12, 2000

(87) PCT Pub. No.: WO99/33658
PCT Pub. Date: Jul. 8, 1999

(30) Foreign Application Priority Data

Dec. 24, 1997 (AU) .............................................. PP1106
Jul. 13, 1998 (AU) .............................................. PP4624

(51) Int. Cl.⁷ .............................. B32B 5/02; B32B 5/22; B32B 5/30; B65B 25/02; B65B 25/04
(52) U.S. Cl. ........................ 428/323; 428/323; 428/325; 428/500; 426/127
(58) Field of Search .................................. 426/127, 124, 426/118; 428/35.4, 36.7, 323, 36.6, 325, 480, 500, 523, 522, 415, 34.3, 34.5, 34.8, 35.2

(56) References Cited

U.S. PATENT DOCUMENTS

| | | | | |
|---|---|---|---|---|
| 4,276,340 A | * | 6/1981 | de Lieris | 428/166 |
| 4,842,875 A | * | 6/1989 | Anderson | 428/118 |
| 5,638,660 A | * | 6/1997 | Kuo | 53/449 |

FOREIGN PATENT DOCUMENTS

WO  WO 95/07949  * 3/1995 ............ C08K/7/22

* cited by examiner

Primary Examiner—Stevan A. Resan
Assistant Examiner—Nikolas J. Uhlir
(74) Attorney, Agent, or Firm—Whyte Hirschboeck Dudek SC

(57) ABSTRACT

Controlled permeability films are provided wherein spherical and/or nonporous filler particles having a size greater than the intrinsic thickness of the film are incorporated in a film forming polymer and the film is treated to reduce the carbon dioxide to oxygen permeability ratio of the film. The film can be a multilayer film of polyolefin polymers or copolymers and polyesters. A further embodiment provides a packaging film comprising an outer layer of a styrene-butadiene copolymer to impart clarity, stiffness, crinkle feeling and glossy finish; an internal layer of a barrier film containing inert preferably spherical filler particles larger than the packaging film thickness; and an inner layer of an ethylene alpha-olefin manufactured by the single-site catalyst technology. The nonporous particles are transparent glass so that the multi-layer film has good clarity. The barrier film is an ethylene-vinyl alcohol copolymer and the loading of filler particles is about 0.1%.

11 Claims, No Drawings

PERMEABLE PACKAGING FILM

BACKGROUND OF THE INVENTION

This invention relates to improved controlled permeability films and to improved methods of making such films.

Controlled permeability films are particularly concerned with allowing gases such as oxygen and carbon dioxide to pass through the film. These films find application in the storage of products which are affected by the presence of gases such as ethylene, oxygen and carbon dioxide and which respire and produce or consume these gases. Conditions for the optimal storage of horticultural products are influenced by factors which include crop species, cultivar, maturity, growing conditions, quality, relative humidity, temperature, packaging and storage duration. Control of carbon dioxide and/or oxygen concentration about such products has been shown to increase the product's storage life. Storage under controlled atmosphere involves modifying the concentration of oxygen, carbon dioxide, water vapour, ethylene and other gases. Rates of respiration vary, with broccoli having a high rate and lettuce having a relatively low rate. Controlled atmosphere research with broccoli has shown that oxygen levels below approximately 1% and $CO_2$ levels higher than about 15% independently induced offensive off-odors and off-flavors. Optimum oxygen and carbon dioxide concentrations reported for broccoli range from approximately 1 to 2.5% and about 5 to 10% respectively. Product life is extended using controlled atmosphere because respiration is slow and pathogen growth is inhibited.

In modified atmosphere packaging, the respiration behavior of the produce is utilized to control the composition of the atmosphere about the produce. The film permeability is matched to the expected respiration behavior as influenced by temperature and atmosphere conditions to provide an optimum carbon dioxide and oxygen content in the package. The accumulated oxygen and carbon dioxide concentrations in such a package will be related to the rate at which they are consumed or generated by the produce and the package permeability, by a simple mass balance. The sensitivity of this balance to oxygen and carbon dioxide permeability requires consistent manufacturing processes to make controlled permeability films.

Perforated films can produce controlled permeability but have the disadvantage of not acting as a barrier to microorganisms and/or moisture.

Controlled permeability can be achieved by careful selection of the polymers used and patent specification WO94/25271 is one example where two different polymers are used in separate layers. This patent also recognizes that clarity, printability, and feel of the film are also critical factors for packaging film used at the retail level. One disadvantage is that the range of permeability is limited. Another means of achieving controlled permeability is disclosed in patent specifications WO92/02580 and WO95/07949. Permeability is achieved by incorporating into the film filler particles larger than the intrinsic thickness of the film. The filler particles are inert and porous. The permeability can be varied by treating the filled film with heat and/or pressure or by stretching the film. The object of such a method is that one film can be treated to provide a range of films with differing permeability. This would enable a food packer to purchase one type of film and treat it on site to produce an appropriate film for each product to be packed. One shortcoming with this type of film is that it is not suitable for retail packaging because the clarity and feel of the film is not acceptable to the majority of consumers.

Another use of controlled permeability films is the storage of nematodes. As disclosed in Patent specification PCT/AU92/00041, the entire disclosure of which is incorporated herein by reference, nematodes may be successfully packed for storage and transport using controlled permeability films.

It is an object of this invention to overcome the shortcomings of the prior art and provide a consumer acceptable film able to provide a wide range of permeability.

BRIEF DESCRIPTION OF THE INVENTION

In a first embodiment this invention provides a controlled permeability film including A film forming polymer; and A spherical and/or non porous inert filler of a particle size greater than the intrinsic film thickness of the film forming polymer which is present in the film in an amount effective to provide permeability of the film;

and the controlled permeability film being further modified to reduce the carbon dioxide to oxygen permeability ratio to approximately 0.5 to 2.0 without causing any perforations in the film.

The layer containing the filler particles may be a barrier film particularly when lower permeabilities are desired. It is also unexpected that acceptable permeability can be achieved using a barrier film. An advantage in using a barrier layer is that the range of permeability that can be achieved by treating one film will commence with a non permeable film and range upwardly into high permeability films. A preferred barrier layer is a polyolefine barrier film especially one composed of an ethylene/vinyl alcohol co-polymer. The films as taught in specification WO92/02580 had a lower permeability limit that was not considered non-permeable.

Where high permeabilities are desired the layer carrying the particles may be a non barrier film such as polyethylene, a copolymer of ethylene/vinyl acetate[EVA] or polyethylene terephthalate.

The particles are substantially spherical and/or non porous as this is thought to provide a more consistent permeability across the film surface. Most available porous particles tend to be of irregular shape and this is thought to contribute to the inconsistency in permeability experienced with porous particles. The majority of non porous particles are of a regular or spherical shape. The loading of the particles in the film is about 0.1% by weight of the film.

The use of non porous filler particles is contrary to current theory which holds that the permeability of films containing porous particles is due in part to gas passing through the film via the pores in the filler particles. In some cases better permeability is achieved using non porous particles. The main advantage of non porous fillers over porous fillers is that all porous fillers are opaque or colored and diminish the clarity of the film, where as non porous particles especially glass are transparent and, in the film, do not adversely effect the film's clarity. Non porous, spherical particles also provide more consistent film permeability once the film has been activated.

In another embodiment the present invention provides a permeable film comprising a multi layer film in which an inner layer consists of a polymer containing inert filler particles of a size larger than the intrinsic thickness of the film.

It has surprisingly been found that permeability is still achievable if the inert filler particles are contained in a layer between 2 or more outer layers. These outer layers can be chosen for their properties of clarity, flexibility and stiffness to provide a consumer acceptable film. The permeability of the outer layers is not critical as the permeability treatment renders the whole laminate permeable. Thus a barrier layer may be used as one of the non particle containing layers. The polymers used in the laminate will be determined by the application for which the laminate is intended. For a high permeability film with good clarity, a laminate or multi layer film made of layers of any combination of polyolefines such as polyethylene [PE], polypropylene [PP], and copolymers of ethylene such as ethylene-vinyl acetate [EVA] ethylene-vinyl alcohol [EVOH], ethylene-ethylene acrylate [EEA], polyethylene terephthalate[PET] or polystyrene [PS] such as styrene-butadiene copolymers. Some films may be heat sealable on at least one surface for heat sealing to other packaging items such as sealable lids for trays etc. PE is a common choice for heat sealing but if the container is made of PET then modified EVA resins are usually recommended.

The spherical inert filler particles need not be non porous but may be porous. There are applications where porous particles are still acceptable because of the benefits provided by the multilayer film structure.

In order to increase the permeability of the extruded film according to any of the embodiments of this invention, the film is subjected to treatment with heat and/or pressure. The method used is disclosed in specification WO95/07949. The treatment is preferably carried out by passing the film between pressure rollers some of which may be heated. The temperature of the rollers contacting the film need not all be at the treatment temperature. An increase in permeability can be obtained without heating or by heating one or both surfaces of the film. The temperature selected will be within the range of 10° C. to 200° C. preferably 21 to 100° C.

The pressure plate or roller applies a compressive force to the film sufficient to thin the film surrounding the particles. The compressive force applied may be in the range of about 2.5 kg to 100 kg, preferably about 5 kg to 75 kg. A roller treatment is preferred as it provides a more consistent film thickness. The film may also be subjected to uni-axial stretching. The stretching force applied may be about 2.5 kg to 75 kg, preferably about 5 kg to 50 kg.

The term "intrinsic film thickness" as used herein refers to the calculated thickness of the multi layer film. The intrinsic film thickness is the thickness the film would have if the filler particles were absent.

The term film as used in this specification is intended to include sheet or film suitable for packaging.

When a particular package design is considered for a particular respiring product the required degree of permeability for oxygen and carbon dioxide can be achieved by making only a portion of the surface of the package permeable to a degree sufficient for the volume of the package, the quantity and type of the product and the expected ambient conditions.

In a preferred aspect of this invention the inert filler may be treated to modify its surface behaviour and consequently modify the films permeability characteristics. The surface modifying agent may reduce the adhesion of the film forming polymer to the inert filler, which may result in the formation of depressions in the film. The depression's may impart micro-perforations to the controlled permeability film. The net effect of the surface modifying agent is the reduction in the effective film thickness. The carbon dioxide to oxygen permeability ratio for the controlled permeability film may also be altered.

The surface modifying agent may be any suitable substance capable of modifying the surface of the inert filler. Preferably, the agent is suitable to render the surface of the inert filler hydrophobic. The surface modifying patent may be inorganic or and inorganic polymeric material, for example polyolefines, particularly polyethylenes, and oxygenated polyethylene, for example polyethylene glycols, nonyl phenyl polyethylene oxide, poly vinyl alcohols, poly vinyl acetates, paraffins, polysiloxanes and silane coupling agents, metal alkoxides such as those of titanium and aluminium, alcohols such as n-butanol, and combinations there of. The surface modifying agent should be used in an amount sufficient to coat at least 10 percent of the surface of the inert filler. The surface modifying agent or combination of surface modifying agents may be added in quantities greater than needed to coat the total surface of the inert particles, so as to fill or partially fill the available pore volume.

In another aspect of this invention be film only layer containing the inert filler may also contain a dispersing polymer. Generally, the dispersing polymer should not be compatible with the film forming polymer so that when combined with appropriate blowing techniques, it forms distinct sections within the composite film. The inclusion of a dispersing polymer may effect the characteristics of the polymer film. For example, where a linear low density polyethylene [LLDPE] film has been combined with a less dense polyethylene [e.g. linear very low density polyethylene] these may lead to an increase in the oxygen permeability of the film. The inclusion of a less viscous polyethylene [e.g. high pressure low density polyethylene] may lead to a thinning of the film.

Suitable polymeric material that may be line to form a composite film include polyolefines of differing grades. Particularly preferred polyolefines are polyethylenes and oxygenated polyethylenes, polypropylene, polyester's including polyethylene terephthalate and polybutylene terephthalate, vinyl polymers including polyvinyl chloride, polyvinyl acetate, ethylene-vinyl acetate co-polymers and ethylene-vinyl alcohols copolymers, polycarbonates and polystyrene, polyalkyleneoxide polymers including polyethylene oxide polymer; and mixtures there of.

A composite film may comprise to or more polymers blended together. The most third blended films may be selected depending upon the desired characteristics of the film. It is preferred that a composite film comprised 30 to 99% by weight placed on the total weight film, of a polyolefine polymer; and approximately 1 to 70% by weight placed on the total weight of the Composites film of a dispersing polymer selected from polyolefines, polyesters, vinyl polymers, polycarbonates, polystyrenes, polyalkyleneolefine polymers and mixtures thereof.

Modifications of both composite film and to the inert filler may provide improved properties such as higher permeability, better permeability/temperature behaviour, more consistent film properties and better carbon dioxide to oxygen permeability ratios.

A preferred multilayer film has an outer layer [ie: a layer used to form the outer layer in a package] to provide clarity, stiffness, crinkle feeling and glossy finish to the multilayer film. This outer layer is also adapted to carry printing. The internal surface of a package formed with this film is provided by an inner layer chosen for its acceptance as a film that can contact food, has heat sealability [low temperature seal initiation and ultimate hot tack strength], clarity, toughness and good machinability and must be able to perform in high speed form-fill-seal equipment. Both the inner and outer layers must comply with food regulations such as those set by the F D A in the USA.

The middle or internal layer carrying the inert filler particles may be a barrier film particularly where a lower range of permeabilities is desired.

The controlled permeability films of this invention may be utilized in the packaging of highly sensitive produce ranging from broccoli to organisms such as nematodes. The produce packaged may be any suitable type sensitive to oxygen deterioration. The multilayer film structure allows retail marketing of minimally processed vegetables of very low to very high respiring produce packaged individually or in combinations. Typical processed produce include grated, chopped lettuce of different types prepared mixed lettuce, grated, julienned, or diced carrots, prepared stir fry mixtures, broccoli and cauliflower florets, prepared soup mixtures and grated cabbage. Typical whole produce include broccoli, brussels sprouts, beans, cabbage, chicory, celery, cauliflower, radish, artichoke, lettuce, tomato, pepper, leeks, parsley, spinach, asparagus, mushrooms and okra, flowers, berries, cherry, melons, mango, papaya, pineapple, avacado, persimmon, grapefruit, kiwi, nectarine, peach, apple, banana, orange, apricot, grape, cranberry, plum, pear, and nashi.

The produce packaged with the treated single or multilayer films of this invention have been found to exhibit improved carbon dioxide to oxygen permeability such that the deterioration of the produce is significantly reduced. It will be recognized that the atmospheric oxygen and carbon dioxide concentrations may be optimized to be within the optimum ranges for a specific product. Reported optimum oxygen and carbon dioxide concentrations for broccoli range of approximately 1 to 2.5% and approximately five to 10% respectively. It is thought that the controlled permeability package achieves extended produce life because of a slowing in respiration and inhibition of pathogen growth.

The concentration of carbon dioxide will be controlled volume respiration rate of the produce less the amount of carbon dioxide released through the film.

This may be expressed $$D[CO_2]/dt = Resp - Perm[CO_2] \times film\ thickness/film\ area$$

The concentration of oxygen is directly related to the permeability film to oxygen. Thus the variation in the ratio of permeability of carbon dioxide to oxygen provides an ability to produce a film having optimum characteristics for any chosen produce.

The single layer controlled permeability film utilized in this aspect of the present invention is preferably a polyethylene film more preferably a low density polyethylene [LDPE] film. The inert filler particle is preferably a non porous particle and in this aspect of the present invention is preferably a glass microsphere filler. It has been found that the broccoli produce may be packaged with produce loadings of approximately 6 to 7 kg per square meter of packaging film. It will be understood that the mass of produce stored relative to the area of polymer film available for gasses to pass through, he is an important parameter affecting internal package atmosphere. Zagory et al [Proc.5th Int. CA Conference, Jun. 14–16, 1989 Wenatchee Washington] recommended packaging broccoli at loading of approximately 3.2 to 4.5 kg per square meter polymeric film. Such loading ranges were found to be ineffective in producing optimum carbon dioxide and oxygen concentrations.

When organisms are packaged which require high levels of moisture and sufficient oxygen, the films of this invention may used. The organisms will include nematodes, live aquatic animals or plants, and aerobic microorganisms. For nematodes for further transmission rates for oxygen and carbon dioxide are:

oxygen—greater than $1.2 \times 10^{-17}$ carbon dioxide—greater than $4 \times 10^{-17}$ These values ensure that adequate oxygen is available and that moisture levels are maintained in the package organism product. Packaging of other organisms can be achieved by adjusting permeability ratios and film thickness to achieve the optimum transmission rates for a given organism.

The unique advantage of the single or multilayer films of this invention is that with one single film a number of packaging applications can be addressed. By varying the conditions of heat and pressure in a pre-packaging step a wide range of film permeabilities can be achieved. This means that a factory processing whole or fresh cut vegetables can purchase one packaging film and treat it on site to produce an appropriate film before each vegetable product from very low respiring products such as chopped cos lettuce or whole carrots, to very high respiring products such as broccoli florets, cauliflower florets, julienned carrots. The film provides optimized combination of properties such as machinability on vertical form, fill, seal equipment, consistent film permeabilities following the heat and/or pressure treatment, good optical characteristics and seal performance.

DETAILED DESCRIPTION OF THE INVENTION

Examples of single layer films using spherical nonporous inert filler particles were made and tested.

EXAMPLE 1

A polyethylene film of 15% low density and 85% linear low density was fabricated according to WO92/02580 with 2% Ballotini glass spheres. The intrinsic film thickness was 30 micron and the particle size of the filler was 53 to 61 microns. The film was processed by passing it between two stainless steel rollers each weighing approximately 7 kg. The rollers can be set a predetermined distance between apart and the bottom roller can move against two springs with spring constants of 0.54 $kgmm^{-1}$. The rollers can be maintained at an elevated temperature bypassing thermostatically controlled heated oil through them. In this example the rollers were at a constant spacing of 40 microns. The permeabilities before and after the treatment are shown in table 1 measured as mole $m^{-1}s^{-1}Pa^{-1}$.

TABLE 1

| | Oxygen permeability | Carbon Dioxide permeability |
|---|---|---|
| Before | $2.5 \times 10^{-15}$ | $6.7 \times 10^{-15}$ |
| After | $4.6 \times 10^{-15}$ | $7.4 \times 10^{-15}$ |

EXAMPLE 2

The procedure and materials of example 1 were used except the roller spacing was 0 micron. The oxygen and carbon dioxide permeabilities before and after are shown in table 3 as mole $m^{-1}s^{-1}Pa^{-1}$.

TABLE 2

| | Oxygen permeability | Carbon Dioxide permeability |
|---|---|---|
| Before | $2.5 \times 10^{-15}$ | $6.7 \times 10^{-15}$ |
| After | $12.4 \times 10^{-15}$ | $16.2 \times 10^{-15}$ |

Multi Layer Films

The preferred polymer for the outer layer is a styrene-butadiene copolymer. A preferred product is Philips K resin grade KR10 which meets FDA regulations. The preferred internal polymer is an ethylene vinyl alcohol copolymer [EVOH]. A preferred product is Nippon Gohsei's Sornaol ET 3803 which has an ethylene content of 38. Prior to co-extrusion a 10% loading of non porous particles was master batched with EVOH in the presence of nitrogen to avoid undesirable effects of moisture. The master batch was then diluted with EVOH during the film production by co extrusion.

The inner layer that directly contacts fresh food is preferably a polyolefin plastomer particularly an ethylene alpha olefin manufactured by the single site catalyst technology. A preferred polymer is Dow plastics PF 1140 plastomer. The multi layer film is preferably produced by co extrusion and to ensure bonding between the layers, a tie layer is provided between each pair of functional layers. The adhesive tie layer is selected from polymers that have good clarity and adhesion between the barrier layer and the outer or inner layer. Preferably the tie layer between the barrier layer and the outer layer is an anhydride modified ethylene vinyl acetate polymer. The preferred adhesive for the tie layer between the barrier and inner layer is an anhydride modified linear low density polyethylene polymer. Preferred product for the tie layer is Dupont's Bynel products such as 3861 and 41E 557.

Table 3 illustrates the structure of the preferred film of this invention.

TABLE 3

| | Thickness [microns] | Polymer |
|---|---|---|
| Outer layer | 11 | K-resin KR10; Shore hardness 65; light transmission 90; Vicat softening point 87° C. |
| Tie layer | 3.5 | Bynel 3861; Vicat 56° C. |
| Middle layer | 5 | Soarnol grade E T 3803; Glass transition temperature 58° C. This layer contains 0.1% loading of non porous particles[ballotini spheres] with particles in the size range of 53 to 75 microns. Loading of 0.4 and 0.8% of filler enable the range of film permeability to be increased. |
| Tie layer | 3.5 | Bynel 41E557; Vicat 93° C. |
| Inner layer | 11 | Dow Affinity PF 1140 Blended with 2.44% loading of antiblock[50% CaCO$_3$ + 3% slip + 47 LLDPE[active anti block ingredient is 1.22%]; Clarity 70; 134 gloss at 20° C.-ASTM D 2457; 1.3% haze-ASTM D1003; Seal initiation temperature 81° C. |
| Total film thickness | 34 | |

The co extrusion is preferably carried out using a seven layer blown film co extruder.

EXAMPLE 3

The permeability of a film can be manipulated by applying pressure to the film. Rollers at room temperature or higher can be used to provide compressive force on the film. This alters or thins the film thickness surrounding the particles and this event results in increased gas transmission rates. The parameters in the treatment which can be varied to alter transmission rates include 1) application of different pressures by varying the weight of the roller
2) adjusting the spacing between the rollers
3) temperature of the rollers
4) speed of the rollers
5) varying the amount of filler used in the film
6) varying the contact area of the roller There are three preferred treatment methods.

Method 1

Two oil heated rollers are set at a desired temperature between 80 and 110° C. The spacing between the rollers and their speed were altered to manipulate film transmission properties. The variation obtained is shown in table 5 where conditions are shown as temperature, spacing in microns, speed as percentage and H./H. indicates two hot rollers.

Method 2

One heated and one cold roller was used in activation. In this method no space setting is used, since the cold roller provides the pressure on the film by its weight [19 kg]. The permeability of the film was modified by using different temperatures and speed settings. For this method C/H was used to represent one cold and one hot roller.

The results of using these two methods are set out in table 4.

In the tables 4 to 6, the figures, shown in brackets after the permeability and ratio values, represent the 90% confidence limit calculated from the standard deviation and the students critical point and divided by the mean and are expressed as a percentage.

Method 3

Vary the activation area, by varying the width of the roller from 0.5 cm for slow respiring produce up to the whole width of the film for high respiring produce. For further information see example 5.

TABLE 4

Effect of Heat activation on the film permeability of 5 layer film impregnated with non porous silica [ballotini spheres loaded to 0.1%.]

| Activation conditions | Film thickness [microns] | Oxygen permeability | Carbon dioxide permeability | Ratio |
|---|---|---|---|---|
| Unrolled [tray] | | 0.016[29.8%] | 0.026[15.4%] | 1.70[14.3%] |
| 80° C.-10% speed, C/H | 42.06 | 4.177[15.92%] | 8.654[16.37%] | 2.10[21.33%] |
| 90° C.-10% speed, C/H | 40.43 | 5.89[13.73%] | 4.75[27.19%] | 0.81[24.2%] |
| 80° C.-20% speed, C/H | 41.42 | 3.625[6.12%] | 2.705[5.15%] | 0.75[2.98%] |
| 90° C.-20% speed, C/H | 35.81 | 4.349[6.48%] | 3.327[10.65%] | 0.76[5.17%] |
| 100° C.-20% speed, C/H | 40.56 | 7.526[9.57%] | 5.658[8.49%] | 0.75[2.82%] |
| 100° C.-20% speed, C/H | 39.87 | 7.058[11.9%] | 5.7[12.6%] | 0.80[1.9%] |
| 110° C.-20% speed, C/H | 39.73 | 7.256[9.34%] | 5.55[8.14%] | 0.77[3.59%] |

TABLE 4-continued

Effect of Heat activation on the film permeability of 5 layer film impregnated with non porous silica [ballotini spheres loaded to 0.1%.]

| Activation conditions | Film thickness [microns] | Oxygen permeability | Carbon dioxide permeability | Ratio |
|---|---|---|---|---|
| 80° C.-30% speed, C/H | 40.09 | 3.619[16.08%] | 3.007[17.89%] | 0.82[6.35%] |
| 90° C.-30% speed, C/H | 40.18 | 6.372[9.50%] | 4.775[12.67%] | 0.75[6.93%] |
| 100° C.-30% speed, C/H | 39.60 | 6.479[6.63%] | 5.044[11.45%] | 0.78[8.86%] |
| 80° C.-20 micrcns, 10%,H/H | 40.52 | 15.23[9.96%] | 11.85[7.99%] | 0.78[1.25%] |
| 90° C.-20 microns, 10%,H/H | 40.21 | 12.89[6.39%] | 9.927[feet.09%] | 0.77[3.51%] |
| 100° C.-20 microns, 10%,H/H | 38.94 | 21.51[4.55%] | 16.78[5.26%] | 0.78[1.78%] |
| 80° C.-20 microns, 20%,H/H | 39.72 | 12.13[5.78%] | 9.668[6.31%] | 0.80[2.58%] |
| 90° C.-20 microns, 20%,H/H | 39.52 | 14.0[4.51%] | [.94[4.16%] | 0.78[1.85%] |
| 100° C.-20 microns, 20%,H/H | 39.49 | 17.23[7.7%] | 13.39[5.48%] | 0.78[3.4%] |
| 80° C.-20 microns, 30%,H/H | 40.42 | 11.57[7.98%] | 9.208[7.89%] | 0.80[2.47%] |
| 90° C.-20 microns, 30%,H/H | 40.09 | 11.58[2.56%] | 8.78[5.0%] | 0.76[2.69%] |
| 100° C.-20 microns, 30%,H/H | 40.41 | 17.53[6.84%] | 13.97[8.52%] | 0.80[2.04%] |
| 110° C.-40 microns, 10%,H/H | 38.51 | 9.85[5.97%] | 7.594[7.86%] | 0.77[4.33%] |
| 110° C.-40 microns, 20%,H/H | 38.09 | 12.01[4.9%] | 9.322[4.94%] | 0.78[0.8%] |
| 110° C.-40 microns, 30%,H/H | 36.55 | 12.22[4.76%] | 9.314[4.92%] | 0.76[1.75%] |

The results of Table 4 are shown graphically in figure one of the drawings where the extrapolated line illustrates the range of that are possible with this invention.

EXAMPLE 4

Five layer blown film in tubular form was slit and separated for trialling under a variety of activation conditions. The film is slit to ensure that the rolled film is one ply to avoid sticking of inner layers onto each other or other undesirable effects. The film is then activated under the following conditions Different pressures namely roller weights of 7 Kg or 12 Kg Roller width is 15 cm Contact time determined by speed setting within range of 10–30%

Temperature from room temperature[RT] to 100° C.

Tables 6A and 6B demonstrate the effect of film activation on the permeability of 0.1% ballotini sphere filled film where the inner layer [Dow Affinity] contacts the hot roller and the outer layer [K-resin] contacts the cold roller. The permeability is shown as ×10$^{15}$ mole m$^{-1}$s$^{-1}$Pa$^{-1}$ measured at 22° C. and 55–60% RH. The permeability is measured for the treated area [15 cm×38 cm] only.

TABLE 5A

[Roller weight 7 Kg]

| Activation Conditions | Film thickness | Oxygen Permeability | Carbon dioxide permeability | Ratio |
|---|---|---|---|---|
| RT-10% | 40.11 | 5.59[24.6%] | 4.43[25.4%] | 0.8[11.9%] |
| RT-20% | 40.04 | 5.46[31.5%] | 4.08[30.5%] | 0.78[13.6%] |
| RT-30% | 40.09 | 8.76[6.2%] | 6.85[5.4%] | 0.78[2.6%] |
| RT-40% | 39.97 | 9.36[7.6%] | 7.43[9.9%] | 0.79[3.9%] |
| RT-70% | 40.42 | 9.14[7.1%] | 7.36[7.1%] | 0.79[3.4%] |
| RT-100% | 40.13 | 7.63[9.2%] | 5.72[8.9%] | 0.75[1.6%] |
| 30° C.-10% | 40.49 | 6.56[15.2%] | 4.85[12.6%] | 0.74[6.2%] |
| 30° C.-20% | 40.08 | 5.67[10.4%] | | |
| 30° C.-30% | 39.94 | 5.89[11.9%] | 4.52[9.6%] | 0.77[3.1%] |
| 40° C.-10% | 40.18 | 9.9[7.6%] | 7.49[8.5%] | 0.77[3.2%] |
| 40° C.-20% | 40.11 | 10.49[18.7%] | 8.09[19.8%] | 0.77[2.5%] |
| 40° C.-30% | 40.22 | 8.86[9.9%] | 6.74[12.6%] | 0.76[4.9%] |
| 50° C.-10% | 40.52 | 9.32[8.5%] | 7.7[7.5%] | 0.83[5.8%] |
| 50° C.-20% | 40.08 | 7.83[10.9%] | 6.86[7.9%] | 0.89[19.2%] |

TABLE 5A-continued

[Roller weight 7 Kg]

| Activation Conditions | Film thickness | Oxygen Permeability | Carbon dioxide permeability | Ratio |
|---|---|---|---|---|
| 50° C.-30% | 39.94 | 5.89[11.9%] | 4.52[9.6%] | 0.77[3.1%] |
| 95° C.-10% | 40.03 | 18.76[5.6%] | 14.79[7.8%] | 0.79[2.9%] |
| 95° C.-20% | 39.82 | 19.89[6.9%] | 15.72[6.5%] | 0.79[2.1%] |
| 95° C.-30% | 40.24 | 19.48[4.2%] | 15.49[9.6%] | 0.79[1.1%] |

TABLE 5B

[Roller weight 12 Kg]

| Activation Conditions | Film thickness microns | Oxygen Permeability | Carbon dioxide permeability | Ratio |
|---|---|---|---|---|
| RT-10% | 39.82 | 10.07[20.26%] | 7.91[20.9%] | 0.79[1.7%] |
| RT-20% | 40.18 | 7.41[13.5%] | 5.98[15.6%] | 0.80[3.5%] |
| RT-30% | 39.83 | 7.69[22.9%] | 5.99[25.6%] | .77[4.9%] |
| 30° C.-10% | 39.88 | 10.80[10.6%] | 8.13[11.7%] | 0.75[1.9%] |
| 30° C.-20% | 40.02 | 10.74[9.0%] | 8.00[9.3%] | 0.75[1.9%] |
| 30° C.-30% | 40.12 | 10.09[9.4%] | 7.82[6.7%] | 0.78[5.3%] |
| 40° C.-10% | 39.88 | 11.16[3.8%] | 8.08[5.2%] | 0.72[3.5%] |
| 40° C.-20% | 40.16 | 10.76[3.1%] | 8.27[2.7%] | 0.77[5.1%] |
| 40° C.-30% | 40.22 | 11.52[6.8%] | 8.17[14.1%] | 0.75[4.4%] |
| 50° C.-20% | 40.10 | 9.18[5.5%] | 7.66[4.8%] | 0.83[1.8%] |
| 50° C.-30% | 40.45 | 8.61[6.5%] | 5.68[18.4%] | 0.66[20.7% |
| 60° C.-10% | 40.22 | 9.23[12.8%] | 7.05[19.0%] | 0.76[14.2%] |
| 60° C.-20% | 40.32 | 8.71[16.5%] | 6.19[21.2%] | 0.71[9.3%] |
| 60° C.-30% | 40.39 | 7.59[4.2%]] | 5.96[9.5%] | 0.78[8.5%] |
| 70° C.-10% | 40.56 | 11.48[5.8%] | 9.32[13.7%] | 0.81[9.7%] |
| 70° C.-20% | 40.65 | 9.58[9.3%] | 7.46[12.3%] | 0.78[5.6%] |
| 70° C.-30% | 40.46 | 6.36[11.5%] | 5.01[17.0%] | 0.79[16.6%] |
| 80° C.-10% | 40.48 | 7.13[5.9%] | 6.11[7.3%] | 0.85[2.8%] |
| 80° C.-20% | 40.47 | 7.49[6.9%] | 6.52[6.6%] | 0.87[3.7%] |
| 80° C.-30% | 40.23 | 8.68[23%] | 7.24[31.3%] | 0.79[20.2%] |
| 85° C.-10% | 40.67 | 7.39[8.6%] | 5.23[12.2%] | 0.71[6.6%] |
| 85° C.-20% | 40.13 | 11.6[6.2%] | 8.35[13.6%] | 0.72[14.7%] |
| 85° C.-30% | 40.49 | 10.75[8.6%] | 7.728[8.7%] | 0.72[3.2%] |
| 95° C.-10% | 40.25 | 12.52[5.5%] | 9.56[6.4%] | 0.76[2.9%] |
| 95° C.-20% | 40.13 | 11.83[13.3%] | 8.75[22.7%] | 0.74[20.2%] |
| 95° C.-30% | 39.88 | 11.61[4.3%] | 8.665[6.3%] | 0.75[4.1%] |
| 100° C.-10% | 39.80 | 12.73[5.7%] | 9.83[7.2%] | 0.77[4.8% |
| 100° C.-20% | 39.82 | 12.66[5.61%] | 10.30[10.3%] | 0.81[7.7%] |
| 100° C.-30% | 40.17 | 11.25[6.7%] | 8.82[16.2%] | 0.82[12.9%] |

EXAMPLE 5

This example measured permeabilities of a given surface area of film which had varying proportions of the area treated. This is one technique for providing a lower range of permeabilities for lower respiring products.

Processing conditions of the film activation process were varied as follows: The width of the metal disc rollers which contacts the film surface during activation were made adjustable, changing from 0.5 cm to 25 cm or more if required. The activated film area at room temperature[21° C.] provides sufficient increase in oxygen permeability in the range of $7-10 \times 10^{-5}$ mole $m^{-1}s^{-1}Pa^{-1}$. Furthermore the processing temperature can be manipulated further if higher permeabilities are preferred.

TABLE 6

[variable width rollers]

| Speed setting | Disc width [cm] | Film Thickness [microns] | Oxygen permeability | Carbon dioxide permeability | Ratio |
|---|---|---|---|---|---|
| 10% | 1.5 | 30.58 | 0.57 [12.9%] | 0.37 [22.1%] | 0.61 [35.3%] |
| 10% | 2 | 39.41 | 0.54 [14.2%] | 0.76 [14.2%] | |
| 10% | 3 | 39.94 | 0.83 [3.7%] | 0.98 [7.4%] | 1.19 [9.4%] |
| 10% | 4 | 40.10 | 1.66 [12.1%] | 1.23 [18.7%] | 0.73 [11.3%] |
| 10% | 4.5 | 39.97 | 1.23 [15.6%] | 1.15 [16.4%] | 0.94 [15.6%] |
| 10% | 5 | 39.79 | 1.57 [6.5%] | 1.43 [21%] | 0.94 [14.4%] |
| 10% | 7 | 39.94 | 2.81 [12.1%] | 2.50 [11.3%] | 0.89 [6.2%] |
| 10% | 8 | 39.73 | 2.14 [12.7%] | 1.64 [12.7] | 0.77 [13.2%] |
| 30% | 4 | 39.29 | 1.19 [11.1%] | 0.90 [15.0%] | 0.77 [17.8%] |
| 30% | 4.5 | 39.65 | 1.20 [27.3%] | 1.09 [18.6%] | 0.97 [24.6%] |
| 30% | 8 | 39.86 | 1.75 [12.5%] | 1.06 [23.2%] | 0.60 [12.5%] |

The measured film permeability results as shown in table 6 include all surface area involved during permeability measurement [both activated and non activated area]. The film and treatment used was the same as in example 4 with activation temperature being 21° C., the roller speed setting being 10% or 30% and the measured surface area being 28 cm×38 cm. The permeability is shown as $\times 10^{15}$ mole $m^{-1}s^{-1}Pa^{-1}$ measured at 22° C. and 55–60% RH.

EXAMPLE 6

The film activation conditions for packaged cut lettuce were determined for a package having an oxygen permeability of $9.5 \times 10^{-15}$ mole $m^{-1}s^{-1}Pa^{-1}$ and the following parameters:

Surface area=28 cm×32 cm
Product weight=285 g
Film thickness=34 microns
Process speed setting=10%
Activation temperature=21° C.
Target oxygen concentration is 3%

TABLE 7

| Storage temperature [° C.] | Permeability required × $10^{15}$ mole $m^{-1}s^{-1}Pa^{-1}$ | Disc roller width [cm] to be used |
|---|---|---|
| 1 | 0.368 | 1 |
| 4.5 | 0.554 | 1.5 |
| 8 | 0.610 | 2 |
| 10 | 1.485 | 4.5 |

EXAMPLE 7

The film activation conditions for packaged cut broccoli florets were determined for a package having an oxygen permeability of $9.5 \times 10^{-15}$ mole $m^{-1}s^{-1}Pa^{-1}$ and the following parameters:

Surface area=18 cm×36 cm [table 8A] and 28 cm×36 cm [table 8B]
Product weight=300 g [table 9A] and 454 g [table 9B]
Film thickness=34 microns
Process speed setting=10%
Activation temperature=21° C.
Target oxygen concentration is 3%

TABLE 8A

| Storage temperature [° C.] | Permeability required × $10^{15}$ mole $m^{-1}s^{-1}Pa^{-1}$ | Disc roller width [cm] to be used |
|---|---|---|
| 1 | 0.949 | 2 |
| 4.5 | 1.446 | 3 |
| 8 | 2.027 | 4 |
| 10 | 3.473 | 6.5 |

TABLE 8B

| Storage temperature [° C.] | Permeability required $10^{15}$ mole $m^{-1}s^{-1}Pa^{-1}$ | Disc roller width [cm] to be used |
|---|---|---|
| 1 | 0.923 | 2.5 |
| 4.5 | 1.407 | 4 |
| 8 | 1.972 | 6.0 |
| 10 | 3.379 | 10 |

The films according to this invention not only enable one feedstock to be transformed into a range of films of differing permeability but all the multilayer films exhibit good clarity and crinkle feel.

What is claimed is:

1. A controlled permeability film comprising:

a film forming polymer;

a non porous inert filler having a particle size greater than the intrinsic film thickness of said film forming polymer and being present in an amount effective to reduce the ratio of carbon dioxide to oxygen permeability of said film forming polymer;

said film being subjected to a pressure treatment to adjust the carbon dioxide to oxygen permeability ratio of the film to between approximately 0.5 and 2.0.

2. The film of claim 1 further comprising an additional film bonded to a surface of said film comprising said inert filler.

3. The film of claim 1 further comprising a food grade film bonded to a surface of said film comprising said inert filler.

4. The film of claim 1 wherein only a predetermined area of the film is subjected to the pressure treatment.

5. The film of claim 1 wherein the filler has been treated with a surface modifying agent.

6. The film of claim 1 which further comprises a dispersing polymer.

7. The film of claim 1 wherein the film forming polymer is a polyethylene.

8. The film of claim 1 wherein the inert nonporous filler is a glass microsphere filler.

9. The film of claim 1 which has been subjected to heat treatment.

10. The film of claim 1 which has been subjected to uni-axial stretching.

11. A packaging film comprising:

an outer layer;

an internal layer comprising a film forming polymer and inert filler having a particle size greater than the intrinsic film thickness and being present in an amount effective to reduce the ratio of carbon dioxide to oxygen permeability of said film forming polymer;

an inner layer of a food grade film;

the packaging film having been subjected to a pressure treatment to adjust the carbon dioxide to oxygen permeability ratio of the film to between approximately 0.5 and 2.

* * * * *